(12) United States Patent
Ataka (10) Patent No.: US 9,761,390 B2
(45) Date of Patent: Sep. 12, 2017

(54) INPUT DEVICE (71) Applicant: ALPS ELECTRIC CO., LTD., Tokyo (JP)

(72) Inventor: Ryuji Ataka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/089,019

(22) Filed: Apr. 1, 2016

(65) Prior Publication Data

US 2016/0300670 A1 Oct. 13, 2016

(30) Foreign Application Priority Data

Apr. 13, 2015 (JP) ................. 2015-081664

(51) Int. Cl.
*H01H 9/54* (2006.01)
*H01H 13/803* (2006.01)
*G06F 3/00* (2006.01)

(52) U.S. Cl.
CPC ............ *H01H 13/803* (2013.01); *G06F 3/00* (2013.01); *H01H 2217/012* (2013.01); *H01H 2300/038* (2013.01)

(58) Field of Classification Search
CPC .......... H01H 13/803; H01H 2217/012; H01H 2300/038; G06F 3/00
USPC ..... 200/42.01, 5 R, 6 A, 511–513, 517, 520, 200/16 R, 292
See application file for complete search history.

(56) References Cited

U.S. PATENT DOCUMENTS

| 4,987,275 A * | 1/1991 | Miller | H01H 13/702 200/275 |
|---|---|---|---|
| 5,536,911 A * | 7/1996 | Madill | H01H 25/041 200/5 A |
| 5,555,004 A * | 9/1996 | Ono | G06F 3/0338 200/6 A |
| 7,528,338 B2 * | 5/2009 | Ataka | H01H 23/003 200/275 |
| 7,915,547 B2 * | 3/2011 | Otani | H01H 1/06 200/5 R |
| 8,263,889 B2 * | 9/2012 | Takahashi | H01H 1/10 200/512 |

FOREIGN PATENT DOCUMENTS

JP 2001-222923 8/2001

* cited by examiner

*Primary Examiner* — Edwin A. Leon
(74) *Attorney, Agent, or Firm* — Beyer Law Group LLP (57) ABSTRACT

An input device includes a first switch unit, a second switch unit, and a third switch unit that switch a combination of a first fixed contact and a second fixed contact, a combination of the second fixed contact and a third fixed contact, and a combination of the third fixed contact and a fourth fixed contact between a contact state and a separation state using a first movable contact, a second movable contact, and a third movable contact that move integrally.

8 Claims, 7 Drawing Sheets

FIG. 5

INPUT DEVICE

CLAIM OF PRIORITY

This application claims benefit of Japanese Patent Application No. 2015-081664 filed on Apr. 13, 2015, which is hereby incorporated by reference.

BACKGROUND OF THE INVENTION

1. Field of the Invention

The present invention relates to an input device including a switch unit.

2. Description of the Related Art

As in Japanese Unexamined Patent Application Publication No. 2001-222923, in a switch unit of an input device of the related art, when a button is pressed, a movable contact comes into contact with a set of fixed contacts and enters a contact state, and when the button is released, the movable contact is separated from the set of the fixed contacts and enters a separation state. However, in the switch unit of the related art, there is a disadvantage in that, when foreign matter or moisture is attached between the fixed contacts, the fixed contacts are short-circuited, and the movable contact is erroneously determined to be in the contact state even though the button is not pressed.

If two switch units are provided in the input device in order to solve the disadvantage, abnormality can be detected when inputs from the two switch units are different.

However, even in a case in which two switch units are provided, it cannot be known which of two states is correct in a case in which abnormality is detected. Therefore, it is necessary for the input device as well as another device having the input device mounted thereon to be stopped. In fact, there is a disadvantage in which there is a device in which it is difficult for an operation to be stopped immediately, and convenience is impaired when an operation of the input device or a peripheral device should be stopped in a case in which abnormality is detected.

Further, there is a disadvantage in that an occupied area of the input device increases if two switch units are provided.

SUMMARY OF THE INVENTION

The present invention provides an input device that can continue to operate even in a case in which abnormality occurs in switch units.

According to an aspect of the prevent invention, there is provided an input device including: at least three switch units configured to switch at least three different combinations among combinations of two fixed contacts selected from among at least four fixed contacts, between a contact state and a separation state using at least three movable contacts that move integrally.

According to this configuration, by providing the at least three switch units, it is possible to detect that abnormality occurs in the switch units from a difference in the state between the switch units and it is possible to determine whether the switch units are in the contact state or the separation state as a whole. Therefore, it is possible to continue to perform the operation of the input device even in a case in which the abnormality is detected in the switch unit.

Preferably, in the input device according to the aspect of the present invention, the input device may further include a determination unit configured to determine that the state larger in number between the contact state and the separation state of the at least three switch units is a contact and separation state of all of the at least three switch units.

According to this configuration, even in a case in which abnormality occurs in some of the switch units, it is possible to determine whether the switch units are in the contact state or the separation state as a whole using highly reliable means such as majority of the contact states and the separation states.

Preferably, in the input device according to the aspect of the present invention, a combination of potential ranges of two places may be made different in a case in which the number of separation states of the at least three switch units is larger than the number of the contact states of the at least three switch units, and a case in which the number of contact states of the at least three switch units is larger than the number of the separation states of the at least three switch units.

According to this configuration, since a determination as to contact and separation of all of at least three switch units can be performed at two fewer places rather than three places, the detection is performed simply.

Preferably, in the input device according to the aspect of the present invention, the fixed contact may include a first fixed contact, a second fixed contact, a third fixed contact, and a fourth fixed contact, the movable contact may include a first movable contact configured to contact or separate the first fixed contact and the second fixed contact with or from each other; a second movable contact configured to contact or separate the second fixed contact and the third fixed contact with or from each other; and a third movable contact configured to contact or separate the third fixed contact and the fourth fixed contact with or from each other, and the at least three switch units may include a first switch unit including the first fixed contact, the second fixed contact, and the first movable contact; a second switch unit including the second fixed contact, the third fixed contact, and the second movable contact; and a third switch unit including the third fixed contact, the fourth fixed contact, and the third movable contact.

According to this configuration, since the fixed contact is shared between the switch units, an occupied area is reduced and a highly reliable input device can be provided in a small size.

Preferably, the input device according to the aspect of the present invention may further include: a first resistor; a second resistor; a third resistor; a first feeding portion to which a first potential is applied; and a second feeding portion to which a second potential is supplied, the first fixed contact may be connected to the first feeding portion, the fourth fixed contact may be connected to the first feeding portion, the first resistor may be connected between the second fixed contact and the second feeding portion, the second resistor may be connected between the third fixed contact and the second feeding portion, the third resistor may be connected between the first feeding portion and the second fixed contact, and a resistance value of the first resistor, a resistance value of the second resistor, and a resistance value of the third resistor may be selected so that a combination of a potential range of the second fixed contact and a potential range of the third fixed contact is different in a case in which the number of separation states of the at least three switch units is larger than the number of the contact states of the at least three switch units, and a case in which the number of contact states of the at least three switch units is larger than the number of the separation states of the at least three switch units.

According to this configuration, even in a case in which abnormality occurs in some of the switch units, it is possible to determine whether the switch units are in the contact state or the separation state as a whole using highly reliable means such as majority of the contact states and the separation states of a plurality of switch units.

Preferably, in the input device according to the aspect of the present invention, the resistance value of the first resistor, the resistance value of the second resistor, and the resistance value of the third resistor may be selected so that a combination of a potential range of the second fixed contact and a potential range of the third fixed contact is different when all of the at least three switch units are in the separation state and when at least one of the at least three switch units is in the contact state in a case in which the number of separation states of the at least three switch units is larger than the number of the contact states of the at least three switch units.

According to this configuration, in a case in which the switch units are determined to be in the separation state as a whole, it can be seen that there is an abnormal switch unit that outputs the contact state. Accordingly, it is possible to manage the state of the input device with higher reliability.

Preferably, in the input device according to the aspect of the present invention, the resistance value of the first resistor, the resistance value of the second resistor, and the resistance value of the third resistor may be selected so that the combination of the potential range of the second fixed contact and the potential range of the third fixed contact is different according to which of the at least three switch units is in the contact state when at least one of the at least three switch units is in the contact state in a case in which the number of separation states of the at least three switch units is larger than the number of the contact states of the at least three switch units.

According to this configuration, in a case in which the switch units are determined to be in the separation state as a whole, a position of an abnormal switch unit that outputs the contact state can be specified, in addition to the fact that it can be seen that there is the abnormal switch unit. Accordingly, it is possible to manage the input device with higher reliability.

Preferably, in the input device according to the aspect of the present invention, the first resistor and the second resistor may have a predetermined resistance value, and a resistance value of the third resistor may be substantially half of the predetermined resistance value.

According to this configuration, even in a case in which abnormality occurs in some of the switch units, it is possible to determine whether the switch units are in the contact state or the separation state as a whole using highly reliable means such as majority of the contact states and the separation states of a plurality of switch units.

Preferably, in the input device according to the aspect of the present invention, the first fixed contact, the second fixed contact, the third fixed contact, and the fourth fixed contact may be formed in this order on the substrate.

According to this configuration, by providing the plurality of switch units, it is possible to detect that abnormality occurs in the switch units from a difference in the output between the switch units and it is possible to determine whether the switch units are in the contact state or the separation state as a whole. Therefore, it is possible to continue to perform the operation of the input device even in a case in which the abnormality is detected in the switch unit.

Preferably, the input device according to the aspect of the present invention may further include a warning unit configured to issue a warning when at least one of the at least three switch units is in the contact state in a case in which the number of separation states of the at least three switch units is larger than the number of the contact states of the at least three switch units.

According to this configuration, in a case in which the switch units are determined to be in the separation state as a whole, it can be seen that there is an abnormal switch unit that outputs the contact state. Accordingly, it is possible to manage the state of the input device with higher reliability.

According to the present invention, it is possible to provide an input device that can continue to operate even in a case in which abnormality occurs in the switch units.

DESCRIPTION OF THE PREFERRED EMBODIMENTS

As illustrated in a perspective view of FIG. 1, an input device 100 of a first embodiment includes a substrate 111 on which various circuit elements to be described below are mounted, and a movable sheet member 112 arranged to cover the substrate 111. The input device 100 includes an operation portion 120 including a portion of the substrate 111 and a portion of the movable sheet member 112.

Figure 1:
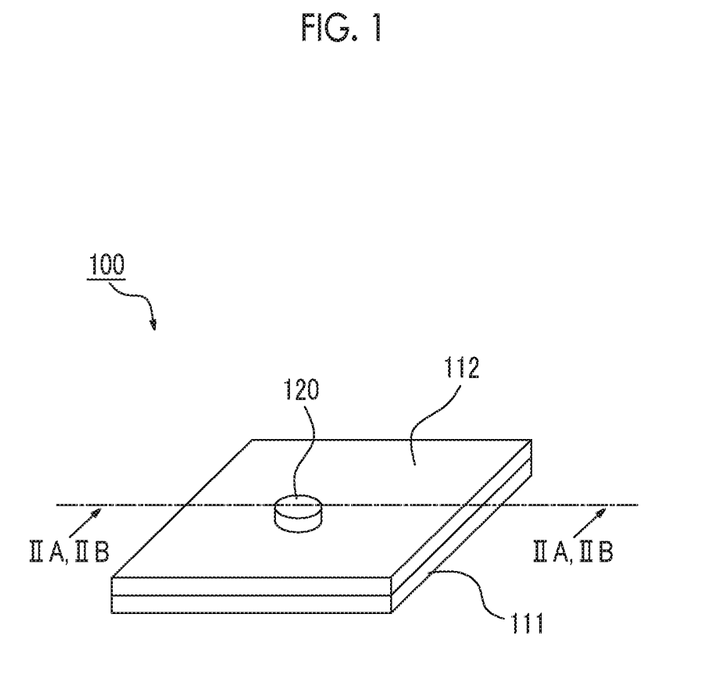
FIG. 1 is a perspective view of an input device of a first embodiment of the present invention.
Figure 2A:
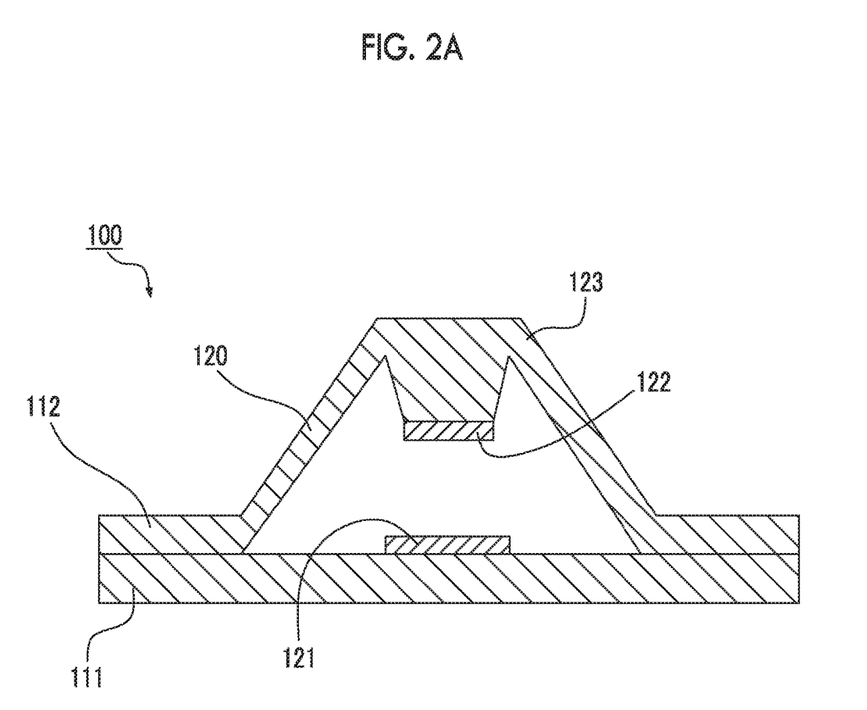
FIG. 2A is a cross-sectional view of the input device taken along a line IIA-IIA in FIG. 1 when viewed in a direction of an arrow in a state in which the input device is not pressed.

FIG. 2A is a cross-sectional view of the input device 100 taken along a line IIA-IIA in FIG. 1 when viewed in a direction of an arrow. The operation portion 120 includes a fixed portion 121 on the substrate 111, and a movable portion 122 arranged on the movable sheet member 112 side to face the fixed portion 121. The operation portion 120 further includes a support portion 123 which supports the movable portion 122 to be arranged in a position separated from the fixed portion 121. In FIG. 2A, the support portion 123 is not pressed, and the movable portion 122 is separated from the fixed portion 121.

Figure 2B:
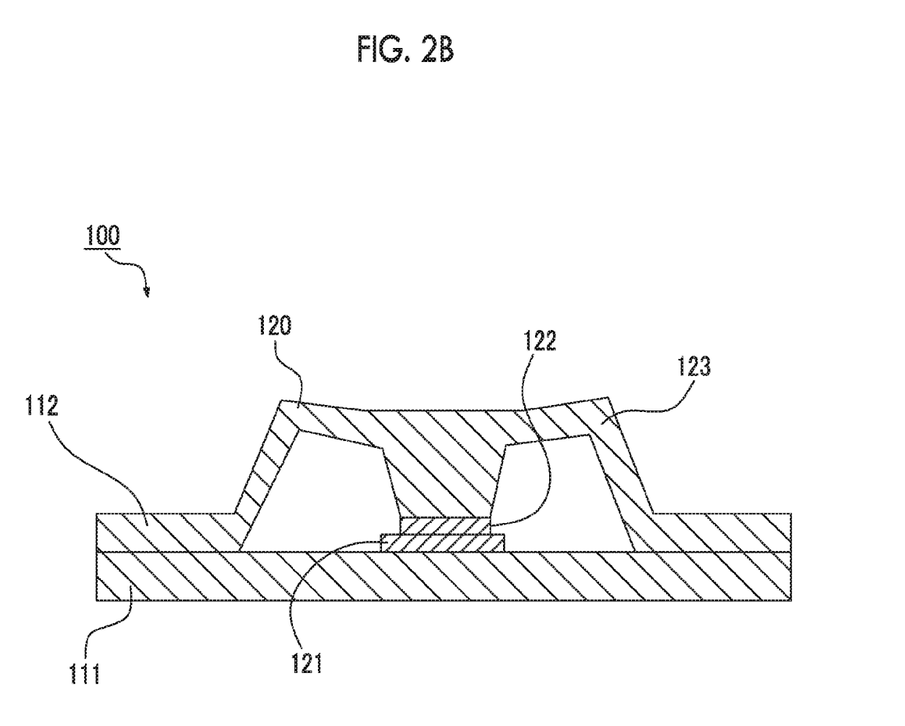
FIG. 2B is a cross-sectional view of the input device taken along a line IIB-IIB in FIG. 1 when viewed in the direction of the arrow in a state in which the input device is pressed.

FIG. 2B is a cross-sectional view of the input device 100 in another state taken along a line IIB-IIB in FIG. 1 when viewed in the direction of the arrow. FIG. 2B illustrates a state in which the support portion 123 is pressed and the movable portion 122 is in contact with the fixed portion 121. The movable sheet member 112 is generally made of rubber except for the fixed portion 121. Accordingly, if the support portion 123 is pressed by a finger or the like, the support portion 123 is deformed as illustrated in FIG. 2B. However, if force is released, the support portion 123 returns to the state illustrated in FIG. 2A. The input device of the present invention may have other shapes as long as the movable portion 122 can come in contact with and can be separated from the fixed portion 121.

Figure 2C:
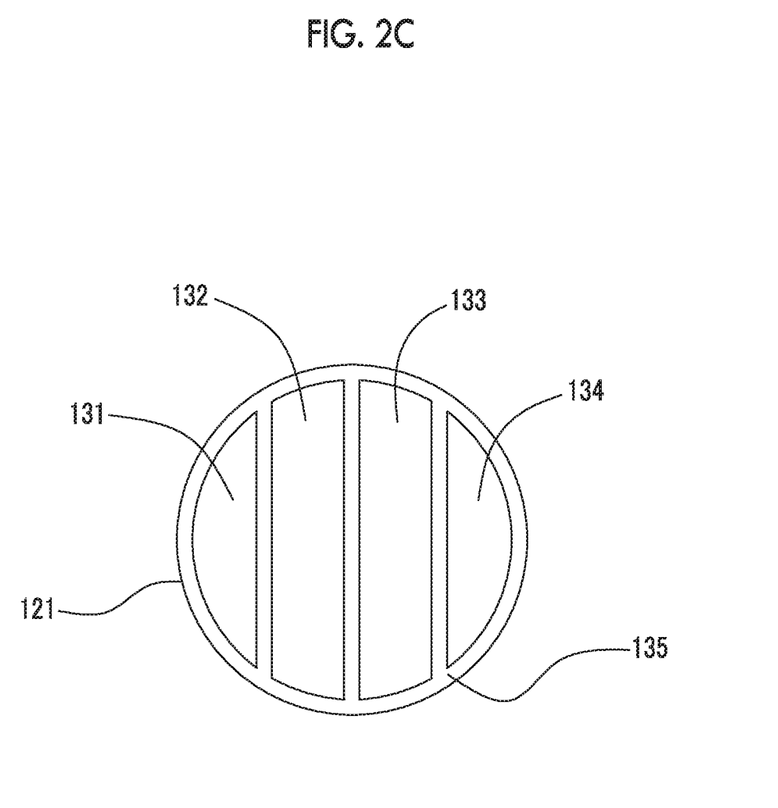
FIG. 2C is a plan view of a fixed portion illustrated in FIG. 2B.

FIG. 2C is a plan view of the fixed portion 121 in FIG. 2A. The fixed portion 121 includes a first fixed contact 131, a second fixed contact 132, a third fixed contact 133, and a fourth fixed contact 134, which are all made of a conductive member on a surface which is in contact with the movable portion 122 in FIG. 2A. The first fixed contact 131, the second fixed contact 132, the third fixed contact 133, and the fourth fixed contact 134 have a shape obtained by dividing a flat disk by three parallel straight lines and are insulated by an insulating region 135. The first fixed contact 131, the second fixed contact 132, the third fixed contact 133, and the fourth fixed contact 134 are arranged in order from left to right in FIG. 2C.

It is preferable that the first fixed contact 131 and the second fixed contact 132 are adjacent to each other, the second fixed contact 132 and the third fixed contact 133 are adjacent to each other, and the third fixed contact 133 and the fourth fixed contact 134 are adjacent to each other, but the shape is not limited to the shape illustrated in FIG. 2C. The number of fixed contacts may be at least 4 or may be 5 or more.

Figure 3:
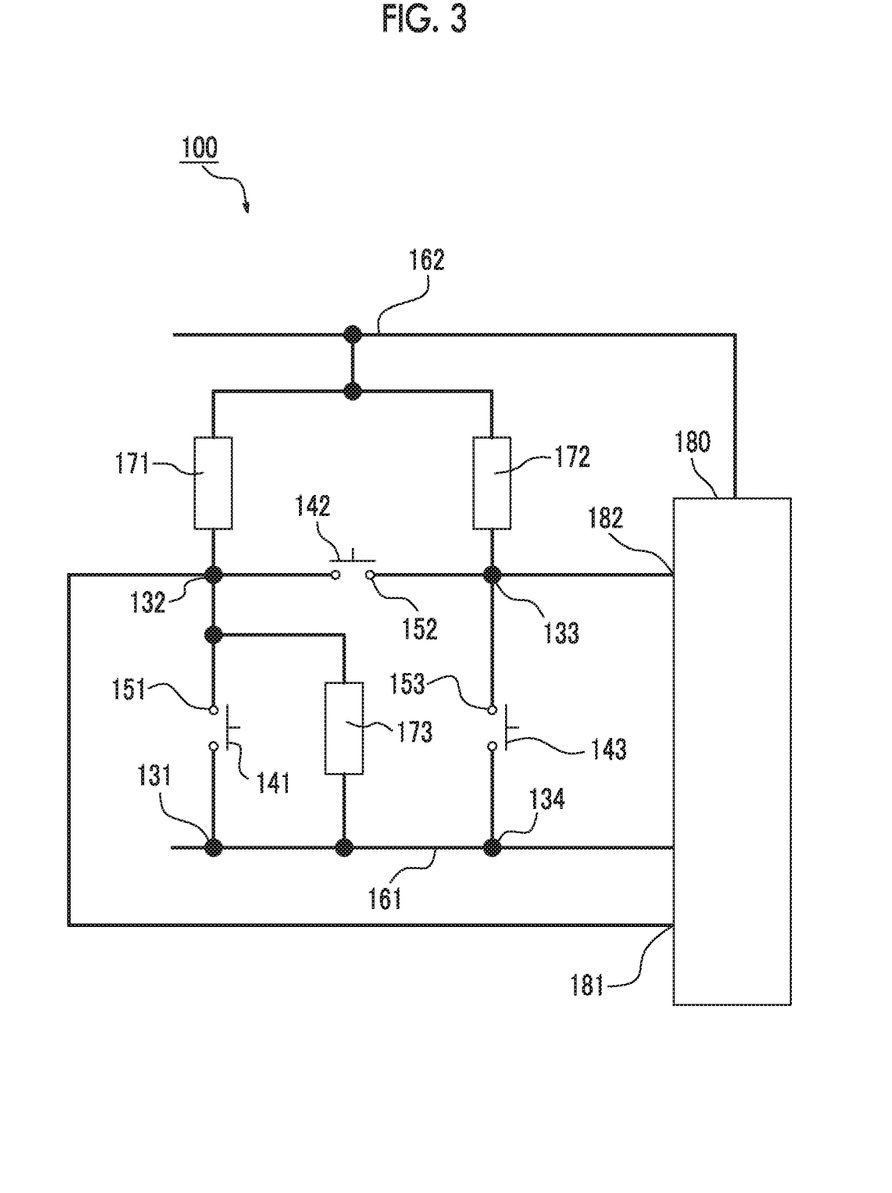
FIG. 3 is a circuit diagram of an input device in FIG. 1.

FIG. 3 is a circuit diagram of the input device 100 of FIG. 1. The movable portion 122 of FIG. 2A includes a first movable contact 141, a second movable contact 142, and a third movable contact 143 that are produced using a conductive member and insulated from each other, as illustrated in FIG. 3. When the movable portion 122 in FIG. 2A is moved, the first movable contact 141, the second movable contact 142, and the third movable contact 143 illustrated in FIG. 3 are moved integrally. The number of movable contacts may be at least 3 or may be 4 or more.

The first movable contact 141 is arranged to switch a combination of the first fixed contact 131 and the second fixed contact 132 to the contact state or the separation state. The second movable contact 142 is arranged to switch a combination of the second fixed contact 132 and the third fixed contact 133 to the contact state or the separation state. The third movable contact 143 is arranged to switch a combination of the third fixed contact 133 and the fourth fixed contact 134 to the contact state or the separation state. The contact state is a state in which the movable contact comes in contact with the two fixed contacts and the two fixed contacts are conducted, and the separation state is a state in which the movable contact is separated from the two fixed contacts and the two fixed contacts are not conducted.

The first fixed contact 131, the second fixed contact 132, and the first movable contact 141 constitute the first switch unit 151. The second fixed contact 132, the third fixed contact 133, and the second movable contact 142 constitute the second switch unit 152. The third fixed contact 133, the fourth fixed contact 134, and the third movable contact 143 constitute the third switch unit 153. Hereinafter, the first switch unit 151, the second switch unit 152, and the third switch unit 153 are collectively referred to as a switch group.

The input device 100 includes a first feeding portion 161 to which a ground potential of 0 V is supplied, and a second feeding portion 162 to which a power supply voltage of VDD (V) higher than the ground potential is supplied. The first fixed contact 131 and the fourth fixed contact 134 are connected to the first feeding portion 161.

The input device 100 further includes a first resistor 171, a second resistor 172, and a third resistor 173. The first resistor 171 has a resistance value of R ohms and is connected between the second fixed contact 132 and the second feeding portion 162. The second resistor 172 has a resistance value of R ohms and is connected between the third fixed contact 133 and the second feeding portion 162. The third resistor 173 has a resistance value of half of R ohms and is connected between the second fixed contact 132 and the first feeding portion 161.

The input device 100 further includes a control unit 180. The control unit 180 includes a first input terminal 181 connected to the second fixed contact 132, and a second input terminal 182 connected to the third fixed contact 133. The control unit 180 is connected to the first feeding portion 161 and the second feeding portion 162.

Figure 4:
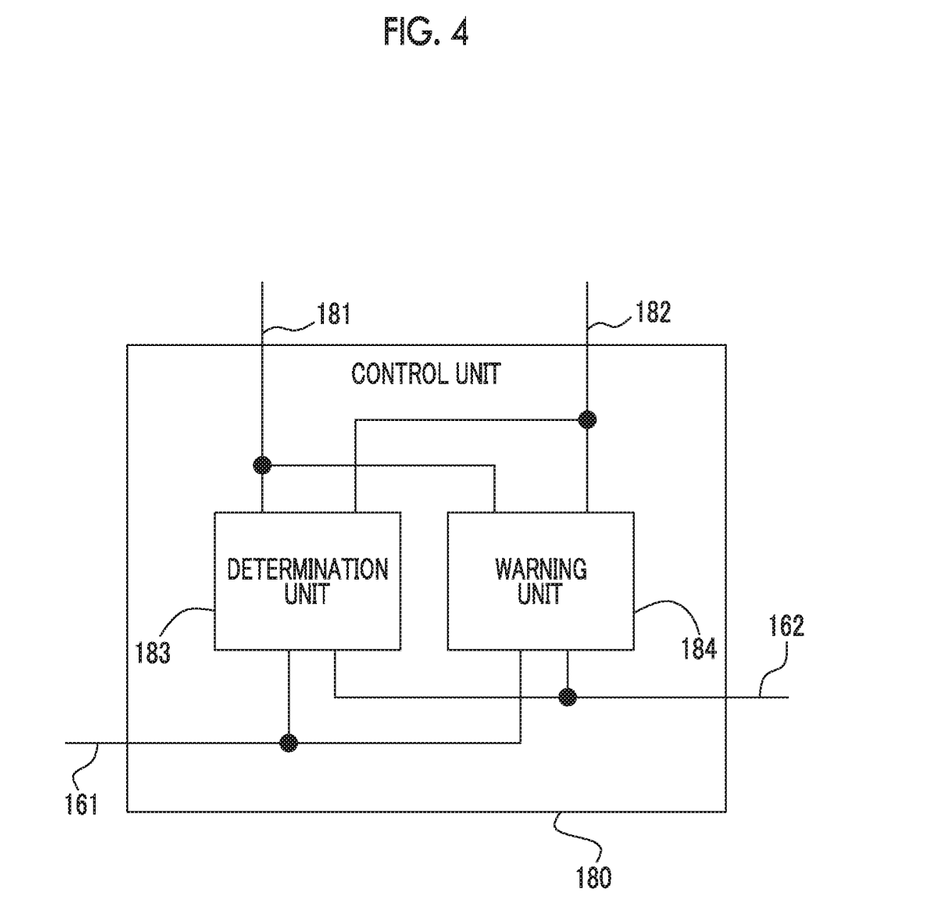
FIG. 4 is a block diagram of a control unit in FIG. 3.

FIG. 4 is a block diagram illustrating functions executed by the control unit 180. The control unit 180 includes a determination unit 183 and a warning unit 184.

The determination unit 183 determines a contact and separation state of the entire switch group based on potentials of the first input terminal 181, the second input terminal 182, the first feeding portion 161, and the second feeding portion 162, and outputs a result of the determination. The warning unit 184 detects whether the switch group is abnormal based on potentials of the first input terminal 181, the second input terminal 182, the first feeding portion 161, and the second feeding portion 162, and outputs a result of the detection as a warning. Although not illustrated, the output may be further processed in the control unit 180 or may be taken out to the outside by a signal line and processed by another processing device.

In this embodiment, the determination unit 183 and the warning unit 184 perform processing using an analog circuit, and output a result of processing. The determination unit 183 and the warning unit 184 do not necessarily include a circuit which is clearly separated for each piece of processing content. The determination unit 183 and the warning unit 184 can be realized by a variety of configurations as long as the output described in this embodiment is obtained. Next, an operation of the input device 100 will be described.

Table 1 shows a potential V1 of the first input terminal 181, a potential V2 of the second input terminal 182, the determination result of the determination unit 183 in FIG. 4, and the output of the warning unit 184 for each of combinations of the contact and separation states of the switch group.

TABLE 1

| Event | SW1 | SW2 | SW3 | V1 | V2 | Determination | Warning |
|-------|-----|-----|-----|------|------|---------------|---------|
| A | OFF | OFF | OFF | VDD/3 | VDD | OFF | OFF |
| B | OFF | OFF | ON | VDD/3 | 0 | OFF | ON |
| C | OFF | ON | OFF | VDD/2 | VDD/2 | OFF | ON |
| D | OFF | ON | ON | 0 | 0 | ON | OFF |
| E | ON | OFF | OFF | 0 | VDD | OFF | ON |
| F | ON | OFF | ON | 0 | 0 | ON | OFF |
| G | ON | ON | OFF | 0 | 0 | ON | OFF |
| H | ON | ON | ON | 0 | 0 | ON | OFF |

In an event column, differences between the combinations of the contact and separation states of the switch group are indicated by A to H.

The SW1 column in Table 1 shows the contact and separation state of the first switch unit 151 (SW1) in FIG. 3. The SW2 column in Table 1 shows the contact and separation state of the second switch unit 152 (SW2) in FIG. 3. The SW3 column in Table 1 shows the contact and separation state of the third switch unit 153 (SW3) in FIG. 3. In the SW1, SW2, and SW3 columns, ON indicates the contact state, and OFF indicates the separation state.

The V1 column indicates the potential V1 of the first input terminal 181. The V2 column indicates the potential V2 of the second input terminal 182. The potential V1 and the potential V2 are potentials relative to a potential 0 V of the first feeding portion 161, and are indicated in volts (V). In order to simplify the description, internal resistance of the switch group or resistance of wirings is ignored.

In event A in Table 1, since the first switch unit 151 (SW1) in FIG. 3 is OFF, the second switch unit 152 (SW2) is OFF, and the third switch unit 153 (SW3) is OFF, the potential V1 becomes VDD/3 and the potential V2 becomes VDD.

In event B in Table 1, since the first switch unit 151 (SW1) in FIG. 3 is OFF, the second switch unit 152 (SW2) is OFF, and the third switch unit 153 (SW3) is ON, the potential V1 becomes VDD/3 and the potential V2 becomes 0.

In event C in Table 1, since the first switch unit 151 (SW1) in FIG. 3 is OFF, the second switch unit 152 (SW2) is ON, and the third switch unit 153 (SW3) is OFF, the potential V1 becomes VDD/2 and the potential V2 becomes VDD/2.

In event D in Table 1, since the first switch unit 151 (SW1) in FIG. 3 is OFF, the second switch unit 152 (SW2) is ON, and the third switch unit 153 (SW3) is ON, the potential V1 becomes 0 and the potential V2 becomes 0.

In event E in Table 1, since the first switch unit 151 (SW1) in FIG. 3 is ON, the second switch unit 152 (SW2) is OFF, and the third switch unit 153 (SW3) is OFF, the potential V1 becomes 0 and the potential V2 becomes VDD.

In event F in Table 1, since the first switch unit 151 (SW1) in FIG. 3 is ON, the second switch unit 152 (SW2) is OFF, and the third switch unit 153 (SW3) is ON, the potential V1 becomes 0 and the potential V2 becomes 0.

In event G in Table 1, since the first switch unit 151 (SW1) in FIG. 3 is ON, the second switch unit 152 (SW2) is ON, and the third switch unit 153 (SW3) is OFF, the potential V1 becomes 0 and the potential V2 becomes 0.

In event H in Table 1, since the first switch unit 151 (SW1) in FIG. 3 is ON, the second switch unit 152 (SW2) is ON, and the third switch unit 153 (SW3) is ON, the potential V1 becomes 0 and the potential V2 becomes 0.

The determination unit 183 in FIG. 4 determines the contact and separation state of the entire switch group based on the combination of a potential range of the potential V1 and a potential range of the potential V2 in Table 1.

Specifically, in a case in which the potential V1 and the potential V2 correspond to a first criterion, the determination unit 183 determines that the contact and separation state of the entire switch group is the separation state (OFF). The first criterion is that which the potential V1 is equal to or more than VDD/3, or the potential V2 is equal to or more than VDD/2. That is, as illustrated in the determination column of Table 1, the determination unit 183 determines that the contact and separation state of the entire switch group is the separation state (OFF) in event A, event B, event C, and event E.

In a case in which the potential V1 and the potential V2 do not correspond to the first criterion, the determination unit 183 determines that the contact and separation state of the entire switch group is the contact state (ON). A case in which the potential V1 and the potential V2 do not correspond to the first criterion is a combination in which the potential V1 is less than VDD/3 and the potential V2 is less than VDD/2. That is, as illustrated in the determination column of Table 1, the determination unit 183 determines that the contact and separation state of the entire switch group is the contact state (ON) in the case of event D, event F, event G, and event H.

In the event in which the contact and separation state of the entire switch group is determined to be in the separation state (OFF), the number of OFFs in the switch group is greater than the number of ONs. In the event in which the contact and separation state of the entire switch group is determined to be the contact state (ON), the number of ONs in the switch group is greater than the number of OFFs. That is, the determination unit 183 determines the contact and separation state of the entire switch group according to majority.

In a case in which the input device 100 is operating normally, any one of event A in which the switch group becomes OFF, and event H in which the entire switch group becomes ON is highly likely to be taken. However, for example, if foreign matter or moisture is attached to the fixed portion 121 in FIG. 2A, some of the switch units in the switch group may be ON and the others may be OFF, as in events B to G. In the case of events B to event G, the contact and separation state of the entire switch group is also determined according to majority, such that the contact and separation state of the entire switch group can be determined with high reliability.

The determination result of the determination unit 183 is output as a change in a signal according to the determination, such as a difference between values of potential.

The warning unit 184 of FIG. 4 warns that there is abnormality based on the combination of the potential range of the potential V1 and the potential range of the potential V2 in Table 1.

Specifically, the warning unit 184 warns that there is abnormality in a case in which the potential V1 and the potential V2 correspond to a second criterion. The second criterion corresponds to any one of a combination in which the potential V1 is VDD/3 and the potential V2 is 0, a combination in which the potential V1 is VDD/2 and the potential V2 is VDD/2, and a combination in which the potential V1 is 0 and the potential V2 is VDD. That is, in the case of event B, event C and event E in which the warning column of Table 1 is ON, the warning unit 184 warns that there is abnormality. In the event that the warning unit 184 warns that there is abnormality, two switch units in the switch group are OFF, and one switch unit is ON. That is, a warning is output in a case in which one in the switch group is ON, even though the contact and separation state of the entire switch group is determined to be OFF. While the ranges of the potential V1 and the potential V2 are shown as fixed values in this embodiment, the ranges may be potential ranges having a certain width.

Further, since the combinations of the potential V1 and the potential V2 are different in event B, event C, and event E, any switch unit in the switch group which is ON can be specified. That is, the switch unit in which abnormality occurs can be specified.

For example, in a case in which foreign matter or moisture is attached to a portion of the fixed portion 121 in FIG. 2A, one switch unit in the switch group is highly likely to become ON even though the contact and separation state of the entire switch group is actually OFF. In this embodiment, for example, the warning unit 184 issues a warning in such a case.

In the case of event A, event D, and event F to event H in which the warning column of Table 1 is OFF, the warning unit 184 does not issue the warning. In the case of event A in which all the switch units in the switch group are OFF and event H in which all the switch units in the switch group are ON, the input device 100 is highly likely to operate normally. One switch unit in the switch group is less likely to become ON due to foreign matter or moisture even though the contact and separation state of the entire switch group is actually ON. Accordingly, the warning unit 184 does not issue a warning in a case in which only one switch unit in the switch group is OFF, as in event D and event F to event H. The warning unit 184 may issue the warning in the case of event D and event F to event H.

An indication of whether or not the warning unit 184 issues the warning is output as a change in the output signal, such as a difference between values of the potential.

In a case in which the potential V1 and the potential V2 correspond to the second criterion, the warning unit 184 may warn that there is abnormality each time or may not necessarily warn that there is abnormality each time. The warning unit 184 may warn that there is abnormality after the fact that the potential V1 and the potential V2 correspond to the second criterion is detected predetermined number of times. The warning unit 184 may also warn that there is abnormality in a case in which the fact that the potential V1 and the potential V2 correspond to the second criterion is detected continuously for a predetermined period of time.

The resistance values of the first resistor 171, the second resistor 172, and the third resistor 173 are determined so that the potential V1 and the potential V2 correspond to the first criterion in the case of event A, event B, event C, and event E, and the potential V1 and the potential V2 do not correspond to the first criterion in the case of event D, event F, event G, and event H. At the same time, the resistance values of the first resistor 171, the second resistor 172, and the third resistor 173 are determined so that the potential V1 and the potential V2 correspond to the second criterion in the case of event B, event C, and event E, and the potential V1 and the potential V2 do not correspond to the second criterion in the case of event A, event D, and event F to event H. A combination of the potential V1 and the potential V2, that is, the resistance values of the first resistor 171, the second resistor 172, and the third resistor 173 are not limited to the values illustrated in this embodiment as long as the determination as to whether the potential V1 and the potential V2 correspond to the first criterion and the second criterion can be performed. The resistance values of the first resistor 171, the second resistor 172, and the third resistor 173 may be determined so that all of event A to event H can be identified. The resistance values of the first resistor 171, the second resistor 172, and the third resistor 173 may be determined so that a case in which the potential V1 and the potential V2 correspond to criteria other than those illustrated in this embodiment or do not correspond to the criteria can be identified.

Figure 5:
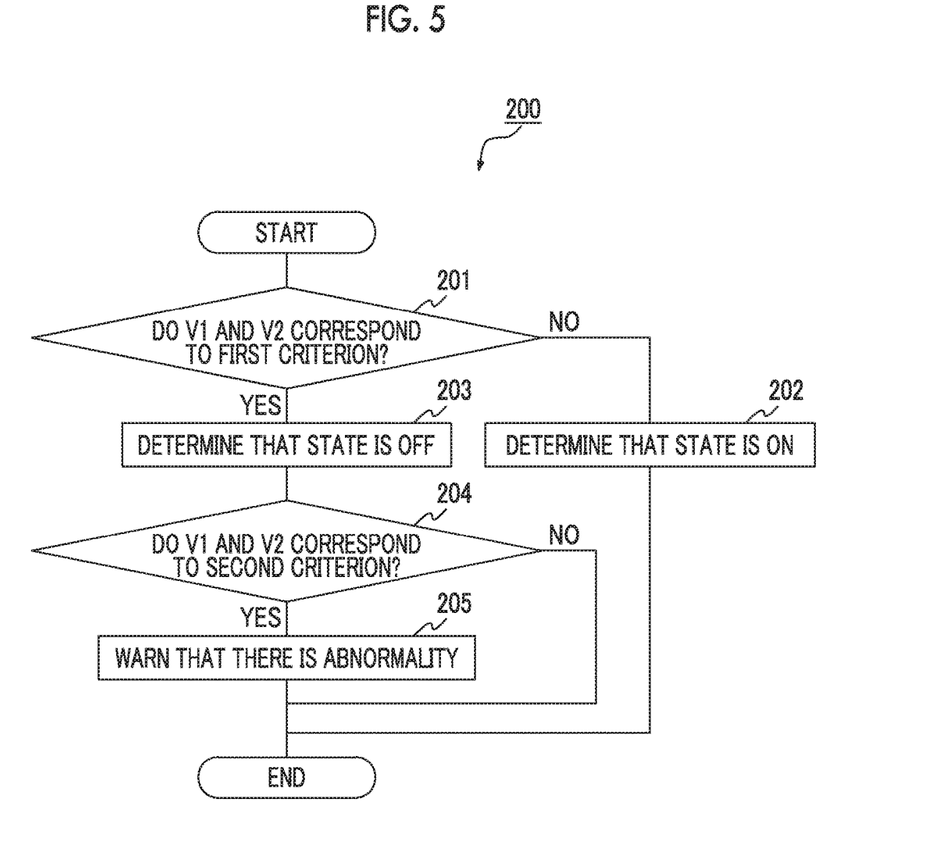
FIG. 5 is a flowchart for explaining an operation of the input device in FIG. 1.

FIG. 5 is a flowchart illustrating a flow of an operation of the control unit 180 of FIG. 4. The control unit 180 does not necessarily clearly divide and execute respective steps, and may simultaneously execute a plurality of steps, or may divide one step into a plurality of steps. In particular, in a case in which the control unit 180 is realized as an analog circuit, an electrical output is immediately obtained for a change in the potential V1 and the potential V2. Accordingly, each step may not be clearly divided as a circuit.

The control unit 180 determines whether the potential V1 and the potential V2 correspond to the first criterion in step 201. In a case in which the potential V1 and the potential V2 do not correspond to the first criterion, the control unit 180 determines that the contact and separation state of the entire switch group is ON and ends the process in step 202. In a case in which the potential V1 and the potential V2 correspond to the first criterion, the control unit 180 determines that the contact and separation state of the entire switch group is OFF in step 203. The control unit 180 determines whether the potential V1 and the potential V2 correspond to the second criterion in step 204 subsequent to step 203. In a case in which the potential V1 and the potential V2 do not correspond to the second criterion, the control unit 180 ends the process. In a case in which the potential V1 and the potential V2 correspond to the second criterion, the control unit 180 warns that there is abnormality in step 205.

The number of switch units included in the switch group may be 4 or more.

According to the input device 100 of this embodiment, by providing the switch group including at least three switch units, it is possible to detect that abnormality occurs from the difference between the states of the switch group, and to determine whether the switch group is in the contact state or the separation state as a whole. Therefore, it is possible to continue the operation of the input device 100 even in a case in which abnormality is detected in some of the switch units in the switch group.

According to the input device 100 of this embodiment, even in a case in which abnormality occurs in some of the switch units, it is possible to determine whether the switch group is in the contact state or the separation state as a whole using highly reliable means such as majority of the contact state and the separation state.

According to the input device 100 of this embodiment, since a determination as to contact and separation of the entire switch group including three switch units can be performed at two fewer places rather than three places, the detection is performed simply.

According to the input device 100 of this embodiment, since the first switch unit 151 and the second switch unit 152 share the second fixed contact 132, and the second switch unit 152 and the third switch unit 153 share the third fixed contact 133, an occupied area becomes smaller than that in a case in which the fixed contact is not shared, and it is possible to provide the highly reliable input device 100 with a small size.

According to the input device 100 of this embodiment, in a case in which the entire switch group is determined to be in the separation state, it can be seen that there is an abnormal switch unit in the switch group. Accordingly, it is possible to manage the state of the input device 100 with higher reliability.

According to the input device 100 of this embodiment, in a case in which the entire switch group is determined to be in the separation state, a position of an abnormal switch unit that outputs the contact state can be specified, in addition to the fact that it can be seen that there is the abnormal switch unit. Accordingly, it is possible to manage the input device 100 with higher reliability.

The present invention can be applied to various fields in which it is required to accurately perform a determination of the contact state and the separation state of the input device. For example, the present invention can be applied to the input device of a vehicle.

It should be understood by those skilled in the art that various modifications, combinations, sub-combinations and alterations may occur depending on design requirements and other factors insofar as they are within the scope of the appended claims of the equivalents thereof.

What is claimed is:
1. An input device comprising:
a switch group including at least three switch units formed of at least three movable contacts including a first movable contact, a second movable contact, and a third movable contact, and at least four fixed contacts includ- ing a first fixed contact, a second fixed contact, a third fixed contact, and a fourth fixed contact, each switch unit being configured to connect or disconnect a pair of fixed contacts selected from among the at least four fixed contacts, by switching corresponding one of the at least three movable contact between a contact state and a separation state, the pair of fixed contacts selected for one of the at least three switch units being different from the pair of fixed contacts selected for another of the at least three switch units such that at least three different combinations of two fixed contacts taken from among the at least four fixed contacts are provided for the at least three switch units, wherein the at least three movable contacts move integrally as a group, wherein the first movable contact connects or disconnects the first fixed contact and the second fixed contact with or from each other, the second movable contact connects or disconnects the second fixed contact and the third fixed contact with or from each other, and a third movable contact connects or disconnects the third fixed contact and the fourth fixed contact with or from each other, wherein the at least three switch units include:
 a first switch unit formed of the first fixed contact, the second fixed contact, and the first movable contact;
 a second switch unit formed of the second fixed contact, the third fixed contact, and the second movable contact; and
 a third switch unit formed of the third fixed contact, the fourth fixed contact, and the third movable contact, wherein the input device further comprises:
 a first feeding portion to which a first potential is applied, the first fixed contact and the fourth fixed contacts being connected to the first feeding portion;
 a second feeding portion to which a second potential is supplied;
 a first resistor connected between the second fixed contact and the second feeding portion;
 a second resistor connected between the third fixed contact and the second feeding portion; and
 a third resistor connected between the first feeding portion and the second fixed contact, and wherein resistance values of the first resistor, the second resistor, and the third resistor are selected such that an output potential of the second fixed contact and an output potential of the third fixed contact have a first set of combinations when a majority of the at least three switch units are in the separation state, and have a second set of combinations when a majority of the at least three switch units are in the contact state, the second set of combinations being different from the first set of combinations.

2. The input device according to claim 1, further comprising:
 a determination unit configured to determine a connection state of the switch group based on a contact/separation state of each of the at least three switch units, such that the contact state or the separation state in which a majority of the at least three switch units are determined to be is the connection state of the switch group.

3. The input device according to claim 1, wherein the switch group has two output potentials selected from among potentials of the at least four fixed contacts, the two output potentials have a first set of combinations when a majority of the at least three switch units are in the separation state, while the two output potentials have a second set of combinations when the majority of the at least three switch units are in the contact state, the second set of combinations being different from the first set of combinations.

4. The input device according to claim 1,
 wherein the resistance values of the first resistor, the second resistor, and the third resistor are selected such that, when a majority of the at least three switch units are in the separation state, a combination of the output potentials of the second and third fixed contacts when all of the at least three switch units are in the separation state is different from a combination of the output potentials of the second and third fixed contacts when at least one of the at least three switch units is in the contact state.

5. The input device according to claim 4,
 wherein the resistance values of the first resistor, the second resistor, and the third resistor are selected such that, when a majority of the at least three switch units are in the separation state but at least one of the at least three switch units is in the contact state, a combination of the output potentials of the second and third fixed contacts is different depending on which one of the at least three switch units is in the contact state.

6. The input device according to claim 1,
 wherein the first resistor and the second resistor have a predetermined resistance value, and
 a resistance value of the third resistor is substantially a half of the predetermined resistance value.

7. The input device according to claim 1,
 wherein the first fixed contact, the second fixed contact, the third fixed contact, and the fourth fixed contact are formed on a substrate and arranged in an order.

8. The input device according to claim 1, further comprising:
 a warning unit configured to issue a warning if at least one of the at least three switch units is in the contact state when a majority of the at least three switch units are in the separation state.

* * * * *